(12) United States Patent
Schwarz

(10) Patent No.: US 9,047,343 B2
(45) Date of Patent: Jun. 2, 2015

(54) FIND REGULAR EXPRESSION INSTRUCTION ON SUBSTRING OF LARGER STRING

(71) Applicant: International Business Machines Corporation, Armonk, NY (US)

(72) Inventor: Eric M. Schwarz, Gardiner, NY (US)

(73) Assignee: International Business Machines Corporation, Armonk, NY (US)

( * ) Notice: Subject to any disclaimer, the term of this patent is extended or adjusted under 35 U.S.C. 154(b) by 123 days.

(21) Appl. No.: 13/741,652

(22) Filed: Jan. 15, 2013

(65) Prior Publication Data

US 2014/0201224 A1    Jul. 17, 2014

(51) Int. Cl.
G06F 7/00        (2006.01)
G06F 17/30       (2006.01)

(52) U.S. Cl.
CPC .............................. *G06F 17/30495* (2013.01)

(58) Field of Classification Search
CPC .............. G06F 17/30; G06F 17/30241; G06F 17/30386; G06F 17/30861; G06F 17/30864
See application file for complete search history.

(56) References Cited

U.S. PATENT DOCUMENTS

| | | |
|---|---|---|
| 4,550,436 A | 10/1985 | Freeman et al. |
| 7,461,370 B2 | 12/2008 | Wyschogrod et al. |
| 8,015,208 B2 | 9/2011 | McMillen |
| 2003/0204703 A1* | 10/2003 | Rajagopal et al. ............ 711/216 |
| 2005/0273450 A1 | 12/2005 | McMillen et al. |
| 2008/0040345 A1 | 2/2008 | Cameron |
| 2010/0057736 A1 | 3/2010 | Srinivasan et al. |
| 2011/0153641 A1 | 6/2011 | Thorup et al. |
| 2012/0005184 A1* | 1/2012 | Thilagar et al. ............... 707/706 |
| 2012/0096036 A1* | 4/2012 | Ebaugh et al. ................ 707/780 |
| 2012/0317136 A1* | 12/2012 | Papish et al. .................. 707/769 |
| 2012/0330994 A1* | 12/2012 | Tonn ............................. 707/769 |

OTHER PUBLICATIONS

Paolieri et al., "ReCPU: A Parallel and Pipelined Architecture for Regular Expression Matching," in IFIP, VLSI—SoC., 2007, pp. 19-24.

* cited by examiner

*Primary Examiner* — Robert Beausoliel, Jr.
*Assistant Examiner* — Nicholas Allen
(74) *Attorney, Agent, or Firm* — Cantor Colburn LLP; Margaret McNamara

(57) ABSTRACT

A technique for pattern matching is provided. A processing circuit receives an input string streamed in as input, and the input string is designated into substrings according to predefined bytes. A first substring of the substrings is in a first register to be compared against a pattern of the predefined bytes in a second register. The processing circuit compares the first substring in the first register to the pattern in the second register according to a type of evaluations specified in a third register, and determines state information that includes a number of states achieved for the pattern based on the comparison. The state information is stored in a fourth register to be utilized in a next run for a next substring of the substrings making up the input string, where the next run builds from the state information in the fourth register.

20 Claims, 16 Drawing Sheets

Zero Column Equations

$S_{0,0} \leftarrow T_{0,0}$
$S_{1,0} \leftarrow T_{1,0} S_{0,in} + T_{1,0} S_{1,in} P_1$
$S_{2,0} \leftarrow T_{2,0} S_{1,in} + T_{2,0} S_{2,in} P_2$
$S_{3,0} \leftarrow T_{3,0} S_{2,in} + T_{3,0} S_{3,in} P_3$
$S_{4,0} \leftarrow T_{4,0} S_{3,in} + T_{4,0} S_{4,in} P_4$
$S_{5,0} \leftarrow T_{5,0} S_{4,in} + T_{5,0} S_{5,in} P_5$
$S_{6,0} \leftarrow T_{6,0} S_{5,in} + T_{6,0} S_{6,in} P_6$
$S_{7,0} \leftarrow T_{7,0} S_{6,in} + T_{7,0} S_{7,in} P_7$

First Column Equations

$S_{0,1} \leftarrow T_{0,1}$
$S_{1,1} \leftarrow T_{1,1}(S_{0,0} + S_{1,0} P_1)$
$\phantom{S_{1,1} \leftarrow} -T_{1,1} T_{0,0} + T_{1,1} P_1 T_{1,0} S_{0,in} + T_{1,1} P_1 S_{1,in}$
$S_{2,1} \leftarrow T_{2,1}(S_{1,0} + S_{2,0} P_2)$
$S_{3,1} \leftarrow T_{3,1}(S_{2,0} + S_{3,0} P_3)$
$S_{4,1} \leftarrow T_{4,1}(S_{3,0} + S_{4,0} P_4)$
$S_{5,1} \leftarrow T_{5,1}(S_{4,0} + S_{5,0} P_5)$
$S_{6,1} \leftarrow T_{6,1}(S_{5,0} + S_{6,0} P_6)$
$S_{7,1} \leftarrow T_{7,1}(S_{6,0} + S_{7,0} P_7)$

First/zero Column after 1st substring input

OpA = "0000000000000ABC"

0 1 2 3 4 5 6 7 8 9 10 11 12 13 14 15

- $S0,0 <= T0,0 = 1$ since GT,LT,EQ all one (this is specified in OpC(0:1), OpB(0:1))
- $S1,0 <= T1,0( S0,in + S1,in P1)$
    — $T1,0 =1$ since GT, LT, EQ all one (this is specified in OpC(2:3), OpB(2:3))
    — $S0,in = 1, P1=0, S1,in=1$
    — $S1,0 =1$ (TRUE)
- $S2,0 <= T2,0 (S1,in + S2,in P2)$
    — $T2,0 =1$ since GT, LT, EQ all one (this is specified in OpC(4:5), OpB(4:5))
    — $S1,in = 1, P2=0, S2,in=1$
    — $S2,0 =1$
- $S3,0 <= T3,0 (S2,in + S3,in P3)$
    — $T3,0 =1$ since GT, LT, EQ all one (this is specified in OpC(6:7), OpB(6:7))
    — $S2,in = 1, P2=0, S3,in=1$
    — $S3,0 =1$
- $S4,0 <= T4,0 (S3,in + S4,in P4)$
    — $T4,0 =$ comparing for character "A" EQ "0" which is false (OpB(8:9) range compare which is "A" EQ, vs. OpA(0) = "0")
    — $S4,0 =$ False

- $S5,0 <= T5,0$ (S4,in + S5,in P5)
  - $T5,0 =$ comparing for character "B" EQ "0" which is false (OpB(10:11) range compare which is "B" EQ, vs. OpA(0) = "0")
  - $S5,0 =$ False
- $S6,0 <= T6,0$ (S5,in + S6,in P6)
  - $T6,0 =$ comparing for character "C" EQ "0" which is false (OpB(12:13) range compare which is "C" EQ, vs. OpA(0) = "0")
  - $S6,0 =$ False
- $S7,0 <= T7,0$ (S6,in + S7,in P7)
  - $T7,0 =$ comparing for character "D" EQ "0" which is false (OpB(14:15) range compare which is "D" EQ, vs. OpA(0) = "0")
  - $S7,0 =$ False

FIG. 9

15th (last) Column after 1st substring input

OpA = "0000000000000ABC"

0 1 2 3 4 5 6 7 8 9 10 11 12 13 14 15

900

- S0,15 <= T0,15 = 1 since GT,LT,EQ all one (this is specified in OpC(0:1), OpB(0:1))
- S1,15 <= T1,15( S0,14 + S1,14 P1)
  - T1,15 =1 since GT, LT, EQ all one (this is specified in OpC(2:3), OpB(2:3))
  - S0,14 = 1, P1=0, S1,14=1
  - S1,15 =1
- S2,15 <= T2,15 (S1,14 + S2,14 P2)
  - T2,15 =1 since GT, LT, EQ all one (this is specified in OpC(4:5), OpB(4:5))
  - S1,14 = 1, P2=0, S2,14=1
  - S2,15 =1
- S3,15 <= T3,15 (S2,14 + S3,14 P3)
  - T3,15 =1 since GT, LT, EQ all one (this is specified in OpC(6:7), OpB(6:7))
  - S2,14 = 1, P2=0, S3,14=1
  - S3,15 =1
- S4,15 <= T4,15 (S3,14 + S4,14 P4)
  - T4,15 = comparing for character "A" EQ "C" which is false (OpB(8:9) range compare which is "A" EQ. vs. OpA(15) = "C")
  - S4,15 = False

FIG. 10

900 Continued 

- S5,15 <= T5,15 (S4,14 + S5,14 P5)
  - T5,15 = comparing for character "B" EQ "C" which is false (OpB(10:11) range compare which is "B" EQ, vs. OpA(15) = "C")
  - S5,15 = False
- S6,15 <= T6,15 (S5,14 + S6,14 P6)
  - T6,15 = comparing for character "C" EQ "C" which is TRUE (OpB(12:13) range compare which is "C" EQ, vs. OpA(15) = "C")
  - S5,14 = 1 (TRUE) since T5,14 compared "B" EQ "B" and T4,13 compared "A" EQ "A"
  - S6,15 = TRUE
- S7,15 <= T7,15 (S6,14 + S7,14 P7)
  - T7,15 = comparing for character "D" EQ "C" which is false (OpB(14:15) range compare which is "D" EQ, vs. OpA(15) = "C")
  - S7,15 = False

- S0:7,15 are put in to OpT which then is input into OpC for the next iteration

RUN 3

OPA

| | TEST | INPUT | 0 | 1 | 2 | 3 | 4 | 5 | 6 | 7 | 8 | 9 | 10 | 11 | 12 | 13 | 14 | 15 | |
|---|---|---|---|---|---|---|---|---|---|---|---|---|---|---|---|---|---|---|---|
| | | | C | C | C | C | C | C | C | C | D | E | F | G | H | I | J | K | |
| 0 | TRUE | T | T | T | T | T | T | T | T | T | T | T | T | T | T | T | T | F | COLUMN 15 IS PASSED ON AS INPUT TO NEXT |
| 1 | TRUE | T | T | T | T | T | T | T | T | T | T | T | T | T | T | T | T | F | |
| 2 | TRUE | T | T | T | T | T | T | T | T | T | T | T | T | T | T | T | T | F | |
| 3 | TRUE | T | T | T | T | T | T | T | T | T | T | T | T | T | T | T | T | F | |
| 4 | EQ 'A' | F | F | F | F | F | F | F | F | F | F | F | F | F | F | F | F | F | |
| 5 | EQ 'B' | F | F | F | F | F | F | F | F | F | F | F | F | F | F | F | F | F | |
| 6 | EQ 'C' | T | F | F | F | F | F | F | F | F | T | F | F | F | F | F | F | F | |
| 7 | EQ 'D' | F | F | F | F | F | F | F | F | F | F | F | F | F | F | F | F | F | |

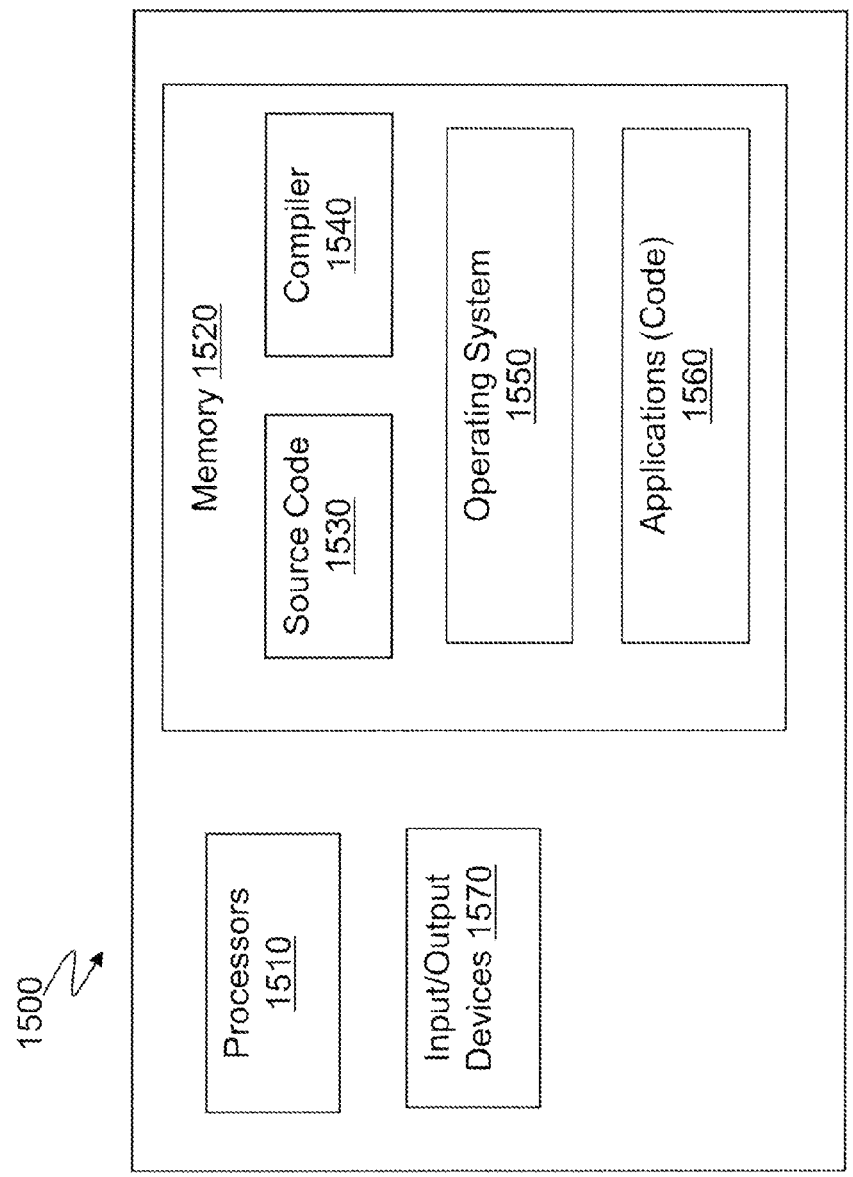

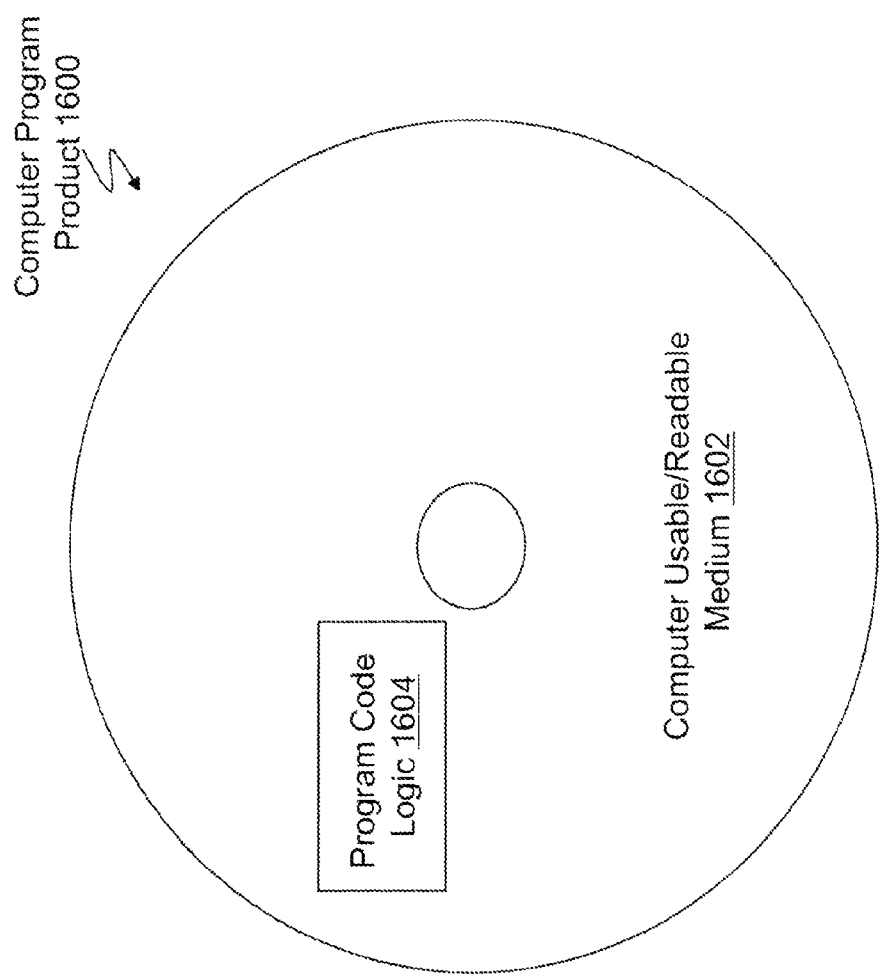

FIND REGULAR EXPRESSION INSTRUCTION ON SUBSTRING OF LARGER STRING

BACKGROUND

The present invention relates generally to pattern matching, and more specifically, to finding a regular expression instruction on a substring of larger string.

Text processing often requires the comparing of character data, including, but not limited to, the comparing of character data strings. Typically, instructions used to compare character data compare a single character of data at a time.

Further, text processing often requires other types of character data processing, including finding the termination point (e.g., end of a string), determining the length of the character data, finding a particular character, etc. Current instructions to perform these types of processing tend to be inefficient.

SUMMARY

Embodiments include a method, system, and computer program product for pattern matching. A processing circuit receives an input string streamed in as input. The input string is designated into substrings according to predefined bytes, where a first substring of the substrings is in a first register to be compared against a pattern of the predefined bytes in a second register. The processing circuit compares the first substring in the first register to the pattern in the second register according to a type of evaluations specified in a third register, and determines state information that comprises a number of states achieved for the pattern based on the comparison. The state information is stored in a fourth register to be utilized in a next run for a next substring of the substrings making up the input string, where the next run builds from the state information in the fourth register.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

FIG. 3 depicts example zero column equations and first column equations for evaluating the pattern in operand B against a substring in operand A in accordance with an embodiment;

FIGS. 7 and 8 depict the evaluation of the equations for the most left column for the first input (i.e., first substring) in operand A in accordance with an embodiment;

FIGS. 9 and 10 depict the evaluation of the equations for the 15th column (i.e., last column) for the first input (i.e., first substring) in operand A in accordance with an embodiment;

FIG. 11 depicts the results of the evaluations of operand B against operand A for the first substring in accordance with an embodiment;

FIG. 12 depicts the results of the evaluations of operand B against operand A for the second substring in accordance with an embodiment;

FIG. 13 depicts the results of the evaluations of operand B against operand A for the third substring in accordance with an embodiment;

FIG. 15 depicts an example of a computer having capabilities, which may be included in exemplary embodiments; and FIG. 16 illustrates a computer program product in accordance with an embodiment.

DETAILED DESCRIPTION

Figure 1:
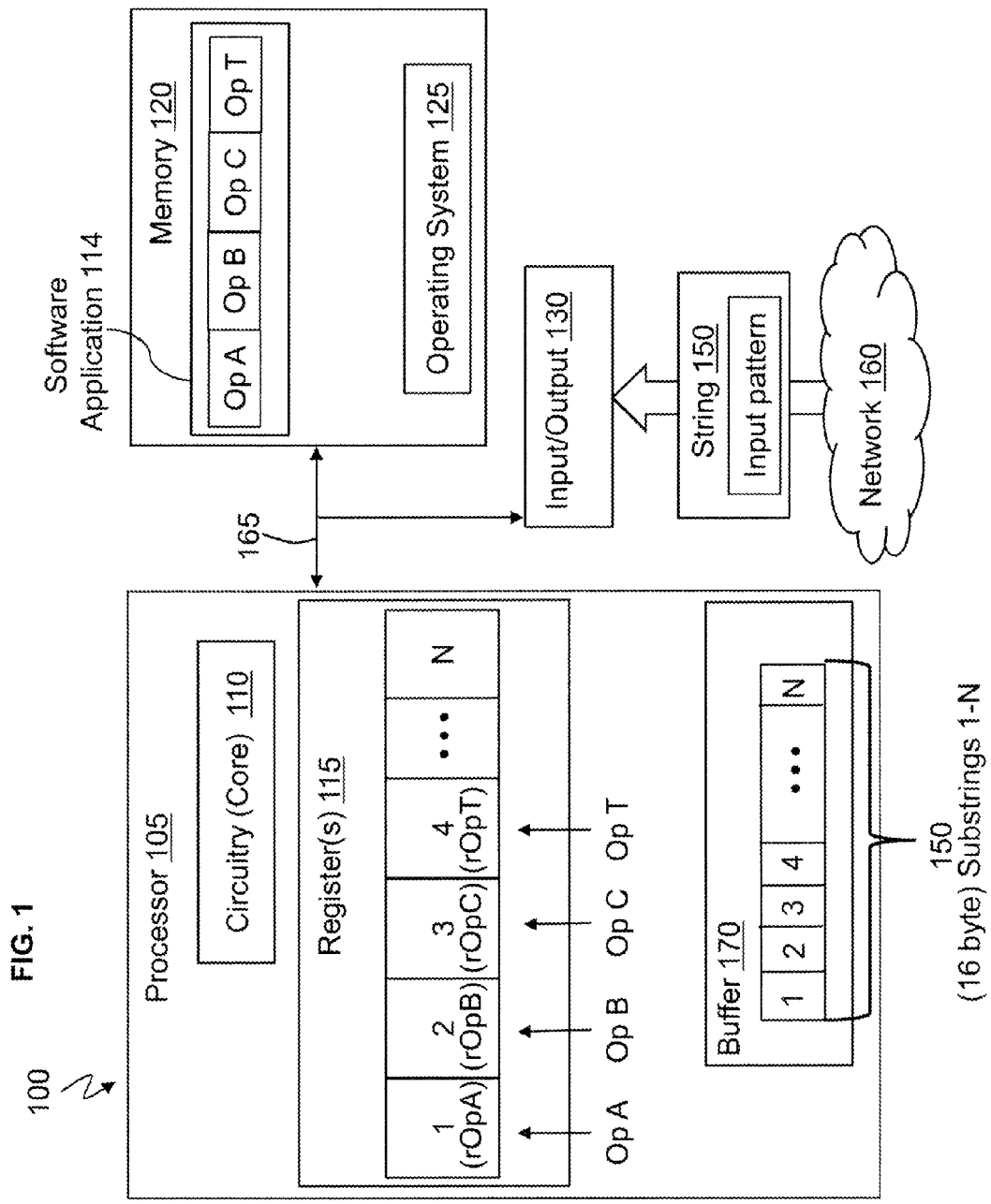
FIG. 1 depicts a block diagram of a computer system in accordance with an embodiment.

The disclosure provides a new hardware instruction which examines a substring at a time and determines how many states in the input string pattern have been achieved and/or whether the whole pattern has been met. An example is a hardware instruction which has 3 input operands of 16 bytes each. The patterns being matched may be defined to consist of characters that could be bytes, halfwords or words, but for simplicity bytes will be used as an example. Operand A is the input 16 byte substring which is streamed in as part of larger string input. Operand B is a description of pattern that is trying to be matched such as a grep command of "([0-9]+[A-Z])" where there is an open parenthesis followed by one or more numeric digits, followed by an uppercase alphabetical character, followed by an end of parenthesis. Operand B uses paired compares to denote ranges. Operand C is used to select how each of those compares works, to select the input (substring), and to output the state that has been achieved. For the example pattern operand B byte 0 and 1 would be paired to find an equal of "(" open parenthesis, bytes 2 and 3 would be paired to find greater than or equal to 0 and less than or equal to 9, bytes 4 and 5 would be paired to find greater than or equal to upper case A, and less than or equal to upper case Z, and bytes 6 and 7 would be paired to find an equal of ")" end of parenthesis. This new instruction can easily be implemented in hardware and provide the equivalent of a grep command or a quick regular expression compare. It can output the states achieved into the next invocation (run) and eventually set a condition code when the end pattern has been achieved.

Regular expression acceleration is usually implemented in software or by specialized engines. The specialized engines do table lookups of a state space and examine one character at a time. Usually, the current state and the current character are sent to a lookup table to tell which state to move to next. Software does similar techniques also. However, the disclosure provides a parallel method for processing multiple characters in a string at once and passing which state is achieved into the next processing of the input string according to an embodiment.

Turning now to FIG. 1, a block diagram of a computer system 100 is generally shown according to an embodiment. The computer system 100 includes one or more processors 105 also referred to as a central processing unit (CPU). The processor 105 has one or more processor cores, and the processor core may be referred to as circuitry 110. The processor 105 may include one or more registers 115 such as registers 1 through N. In computer architecture, a processor register is a small amount of storage available as part of a CPU or other digital processor, and data can be loaded into the register 115 from memory 120 for arithmetic manipulation by the circuitry 110. Particular registers 115 are individually labeled as register rOpA, rOpB, rOpC, and rOpT (to respectively correspond to operands A, B, C, and D), but it is understood that additional registers may be included.

The memory 120 may include one or more software applications 114 with program logic to perform the various operations as discussed herein. The memory 120 may include operating system (OS) 125 as an operating system for running the computer system 100. The software application 114 includes computer executable instructions which are executed by the circuitry 110 of the processor 105. The software application 114 includes instructions/operands of operand A, operand B, operand C, and operand T. The instructions/operands for operand A, operand B, operand C, and operand T may be respectively stored for processing by the circuitry 110 in registers rOpA, rOpB, rOpC, and rOpT.

The computer system 100 includes one or more input/output devices 130 or interfaces for receiving an input such as a input string 150 which may be communicated from a network 160 (such as the Internet). The processor 105, the memory 120, and the input/output device 130 are all connected by one or more busses 165.

Figure 2:
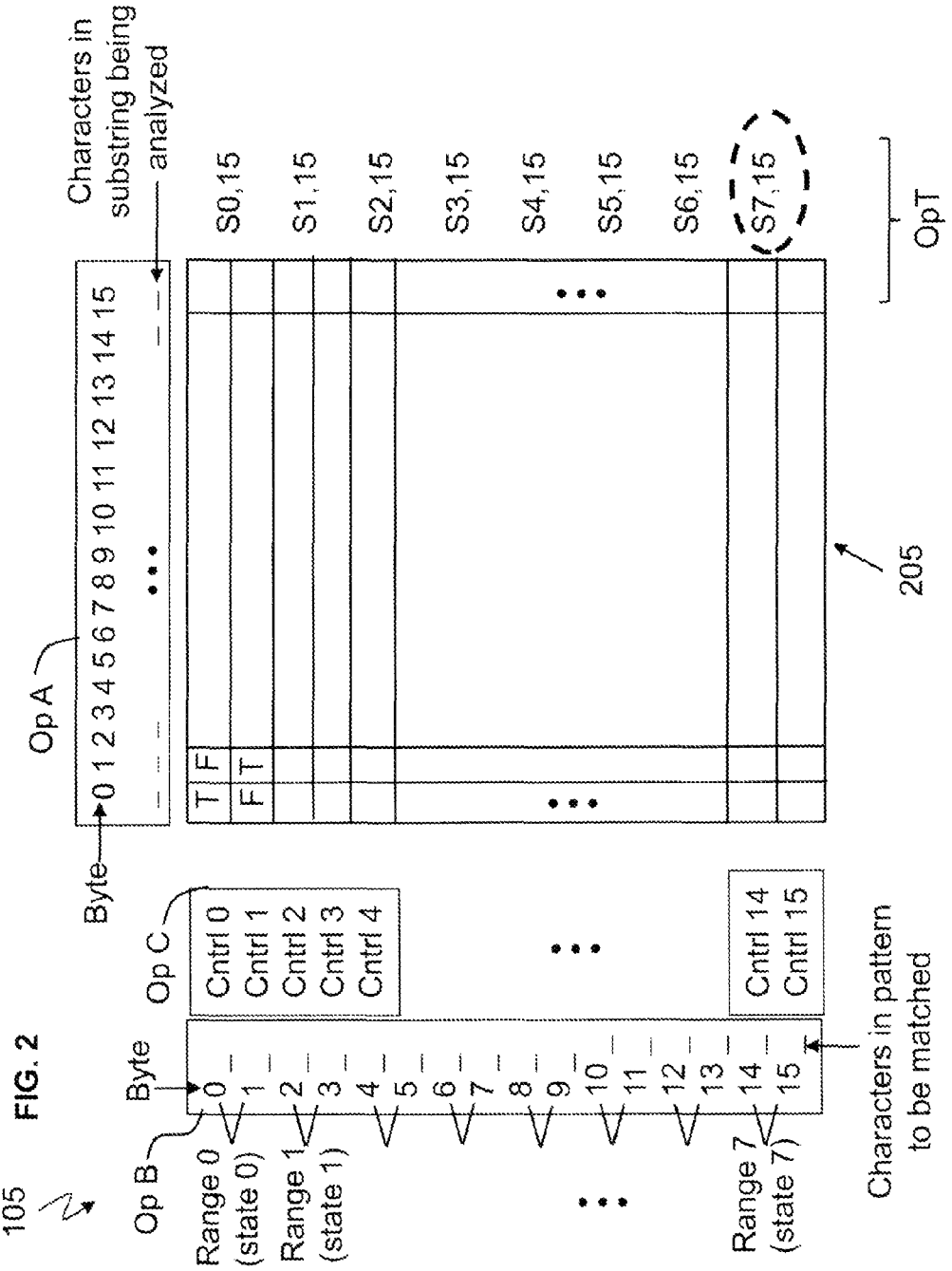
FIG. 2 depicts a 16 byte by 16 byte regular expression compare of a substring of the input string with pattern in accordance with an embodiment.

The software application 114 has one or more hardware instructions which examine a substring (e.g., each substring comprises 16 bytes) at a time of the large input string 150 and determines how many states (e.g., S0, S1, S2, S3, S4, S5, S6, and S7) in the input string pattern have been achieved and/or whether the whole pattern has been met (e.g., which may be based on condition code). An example is a hardware instruction (of software application 114) which has 3 input operands A, B, and C of 16 bytes each. The patterns being matched (16 byte at a time) are characters that may be represented as bytes, halfwords, or words depending on the encoding (ASCII, EBCDIC, UTF-8, UTF-16, etc.). As an example, characters that are a byte in length (e.g., ASCII, EBCDIC) are described. Operand A is the input 16 byte substring which is streamed in as part of the larger input string 150. The larger input string 150 may be much larger than 16 bytes. Operand B is a description of the stored pattern that is to be matched such as a grep command of "([0-9]+[A-Z])" where there is an open parenthesis followed by one or more numeric digits, followed by an uppercase alphabetical character, followed by an end of parenthesis. Operand B uses paired compares to denote ranges. The pattern in operand B is 16 bytes. Operand C is used to select how each of those compares works, to select the input substring of the large input string 150, and to input the states that has been achieved from prior iterations or for the initial invocation. Operand C contains the type of evaluation for the pattern. The result is Operand T and has the same format as Operand C and copies the operand types and outputs the states that have been achieved at the end of the substring. For the example pattern in operand B, byte 0 and 1 are paired (as a (1st) range) to find an equal of '(' open parenthesis, bytes 2 and 3 are paired (as another ($2^{nd}$) range) to find greater than or equal to 0 and less than or equal to 9, and so forth. Each range corresponds to a state. The state is the criteria or requirement that is to be fulfilled as true (before moving to the next state). For example, a state is the requirement that a character in the pattern be matched to a character in the substring being analyzed, and when it is true that there is a match to the character in the pattern, the state is fulfilled. A hardware instruction of the software application 114 can be implemented in hardware (e.g., the processor 105) and provide the equivalent of a grep command and/or a quick regular expression compare in evaluating the states. The hardware instruction of the software application 114 can output the states achieved (as true) for a previous invocation (run) to the result in Operand T and be used in the next invocation next run) as a new Operand C to match the pattern against the next substring input into operand A. The software application 114 sets a condition code to determine/recognize when the end pattern has been achieved/matched FIG. 2 illustrates a 16 byte by 16 byte regular expression compare (comparison chart) of a substring of the input string 150 executed by the processor 105 according to an embodiment. The software application 114 is configured to divide the large input string 150 into numerous (16 byte) substrings (e.g., substring 1 through substring N, which is the first through the last substring) so that that each substring 1-N defines the larger input stream 150. The substrings 1-N may be stored in buffer 170 on the processor 105 (like a queue waiting for it respective turn for pattern matching). Each substring is respectively compared to determine a match.

For example, in FIG. 2, operand A (e.g., loaded/stored in register rOpA) is the 16 byte substring (e.g., the first substring) of the streaming input string 150 (e.g., loaded by software application 114). Operand A has bytes 0 through 15 which totals to 16 bytes. Operand B is the pattern (16 bytes) that is compared against the substring (i.e., data) in operand A to determine if operand A (having a substring of the input string 150) contains the desired pattern. Operand B includes bytes 0 through 15 to each be compared against each byte 0 though 15 (of the particular substring) in operand A. Operand C is a control vector specifying the type of compares (i.e., specifying the type of comparisons between each byte in operand B to each byte in operand A). The type of comparisons/evaluations include equal to (EQ), less than (LT), greater than (GT), and combinations thereof (such as less than or equal to, or greater than or equal to).

The processor 105 executing hardware instructions of the software application 114 can determine if the pattern of operand B is matched by determining if state 0 (S0) through state 7 (S7) are sequentially met/satisfied during the truth comparisons every byte in operand B to each byte in operand A. When state 7 (S7) has been reached (after sequentially meeting states 0-6 (S0-S6), the processor 105 determines that the pattern in operand B has been matched to the substring in the operand A (which can be based on evaluating substrings 1-N). When state 7 (S7) has not been reached, the output (which includes the last state (information) satisfied as being met (i.e., true) and column 15) is stored in operand T as state information for this particular substring (so that the processor 105 can continue by evaluating the next (16 byte) substring loaded into operand A). For example, the last state determined to be true can be state (S5) for character 15 (stored in operand T) for the previous substring. The next substring (which is the next bytes 0-15 loaded into operand A) will be evaluated starting from state 5 (S5) is true. When the state 7 (S7) is reached (such as S7, 15 which means state 7, character 15) (when evaluating, e.g., the third substring), the software application 114 determines that the pattern of operand B has been matched to the input string 150.

Assume that the processor 105 compares the last byte 15 in operand B against the last byte 15 in operand A for the given substring (e.g., substring 1) of the input string 150; the stored comparisons indicating true and/or false (along with the reached states) for each comparison is stored in register rOpT corresponding to operand T. In other words, operand T in target register rOpT is the output register, and operand C in register rOpC is the input register. Operand T is a control vector with the output state information (from the most recent compare of the given substring being compared against operand B). Operand T stores the last compares in column 15 for the previous substring (e.g., the first substring) as a control vector, and the control vector is to be utilized as input for comparisons to the second (next) substring in the target register rOpT. Operand T is configured for sequential storage of the output from the first substring, to the second substring, to the next substring, through the last substring of the larger input string 150. Operand T in register rOpT having the output becomes the new operand C for register rOpC (i.e., becomes the next input), and the old register rOpC becomes the next register rOpT for receiving the output of the compares for the second substring. The input register for operand C and the output register for operand T continue to alternate for each execution of the upcoming substring, or they can actually denote the same register given the read of Operand C occurs earlier than the write of Operand T. Operand T additionally includes the type of evaluations that were in operand C.

The compares of (characters for) byte 0 and byte 1 form a single range comparison, and these two compares (forming the single range 0) are designated as a state (which is state 0 (S0) in this case). Similarly, the compares of characters for byte 2 and byte 3 are the requirements designated as state 1, and this continues through state 7. For 16 bytes, there are 8 states (e.g., states S0 through S7) that the software application 114 maintains. To form the 8 ranges, 16 characters are to be paired up (2 at a time) into the 8 ranges. Each individual range has two compares associated with the range which are a first bound on the range and a second bound on the range, where the first bound of the range is defined by the type of evaluation/comparison for character 0 at byte 0 while the second bound of the range is defined by type of evaluation/comparison for character 1 at byte 1. Accordingly, when comparing the pattern to be matched in operand B (register rOpB) to the substring (currently loaded) in operand A (register rOpA), range 0 (i.e., state 0) is true when the compare of byte 0 (character 0) is true/met for control 0 and when the compare of byte 1 (character 1) is true/met for control 1. When both compares for byte 0 and byte 1 are met, the processor 105 determines that state 0 is true/met, and this compare is for byte 0 and byte 1 respectively of operand A. Note that the compare is an evaluation (e.g., equal to, less than, and/or greater than) as defined in the operand C (which defines the type of evaluation for each byte 0-15 in operand B against each character in the substring of operand B). Controls 0 through 15 are the type of evaluations. Following the previous example, the comparison chart 205 shows true (T) for row 0, column 0 (which is comparing byte 0 of operand B to byte 0 of operand A) and shows true (T) for row 1, column 1 (which is comparing byte 1 of operand B to byte 1 of operand A); as such, state 0 (range 0) has not been met since both compares must be true in the same column for the range to evaluate true. Note that although the example explained bytes 0 and 1 for range 0, the explanation applies for all bytes with corresponding evaluations forming respective ranges. FIG. 2 refers to the truth of individual bound and subsequent figures refer to the truth of a pair of bounds called a range. Note that all bounds can be compared in parallel, evaluating 16 compares for each of 16 bytes of operand A which amounts to 256 compares evaluated in parallel. The range comparisons are paired bounds comparisons and total to 8 range compares for each 16 bytes of operand A which is 128 range compares.

The processor 105 (executing the software application 114) is configured to (eventually) find S7,0:15, which means the processor 105 determines whether state 7 is met after evaluating characters 0 through 15 of in the operand B (against operand A for the, e.g., the first substring), and then the pattern matching (i.e., compares) stops because the pattern in operand B is found in the input string 150 (by comparing one substring at a time). When the pattern is not found in the first substring, the processor 105 preserves S0:7, 15 into vector CC (condition code) of operand T, which means states 0 through 7 are stored. It is noted that when state 7 (S7) is reached/met, the pattern is found. Also, the next substring of the input string 150 is loaded into operand A for comparison against operand B as discussed herein.

In FIG. 2, it is assumed that each blank underscore "_" is a character. So there are (up to) 16 characters (identified with respective bytes 0-15) in the pattern to be matched in operand B, which are to be compared (to determine a match or not) against each of the (up to) 16 characters in the substring being analyzed in operand A.

FIG. 3 illustrates example zero column equations (which correspond to the far column to the left in comparison chart 205) and first column equations (which corresponds to the second column from the left in the comparison chart 205) for evaluating the pattern in operand B against the substring in operand A.

The zero column equations can be evaluated in parallel since they are independent of each other. State 0 being achieved at column 0 (byte 0 of operand A) is denoted by S0,0 where Sx,y the x corresponds to the state and the y refers to the column. State 0 achieve in column 0 is equal to the truth of the range compare for state 0 in column 0 denoted by T0,0. Tx,y refers to the truth of the range compare for state x in column y. All 128 range compares can be calculated in parallel and are independent of each other. The second line describes state 1 achieved in column 0 denoted by S1,0 which is equal to the logical OR of two terms. The first term is truth of range compare 1 in column 0 denoted T1,0, AND that state 0 was true in the input from operand C denoted S0, in which is due to either initialization of operand C or a previous invocation had this state valid in its final column in our example denoted by column 15. The second term introduces the concept of having one or more characters allowed to be true in a state; for instance the example of ([0-9]+[A-Z]) has one or more numeric digits denoted by the range 0 to 9 denoted by [0-9] and a plus symbol "+". In these equations the + symbol is associated with a state being allowed to stay true if there are more characters matching this state and this state was previously true. The second term in the right hand side of the second equation is T1,0 S1, in P1 where T1,0 is true when range compare for state 1 is true for column 0 and S1, in is true when input operand C has this state 1 true as input, and P1 is true when state 1 is a plus state, and where the juxtaposition of these symbols implies the logical AND operation and where the "+" symbol implies the logical OR operation. This second term implies state 1 will stay true if the current range compare is true and the previous input had this state true and this state has a plus symbol. In general this is true of all subsequent states, the first right hand term denotes a state can become true if the prior state was true and the current column and state evaluate to be true or the second right hand term denotes a plus symbol can cause the state to remain true. For the first column equations a slight reduction is shown in the equations where the truth of the range compare is pulled out of the two terms and logically ANDed with the parenthetical expression of either the prior state in the prior column or the current state in the prior column and that there is a plus symbol for this state.

Figure 4:
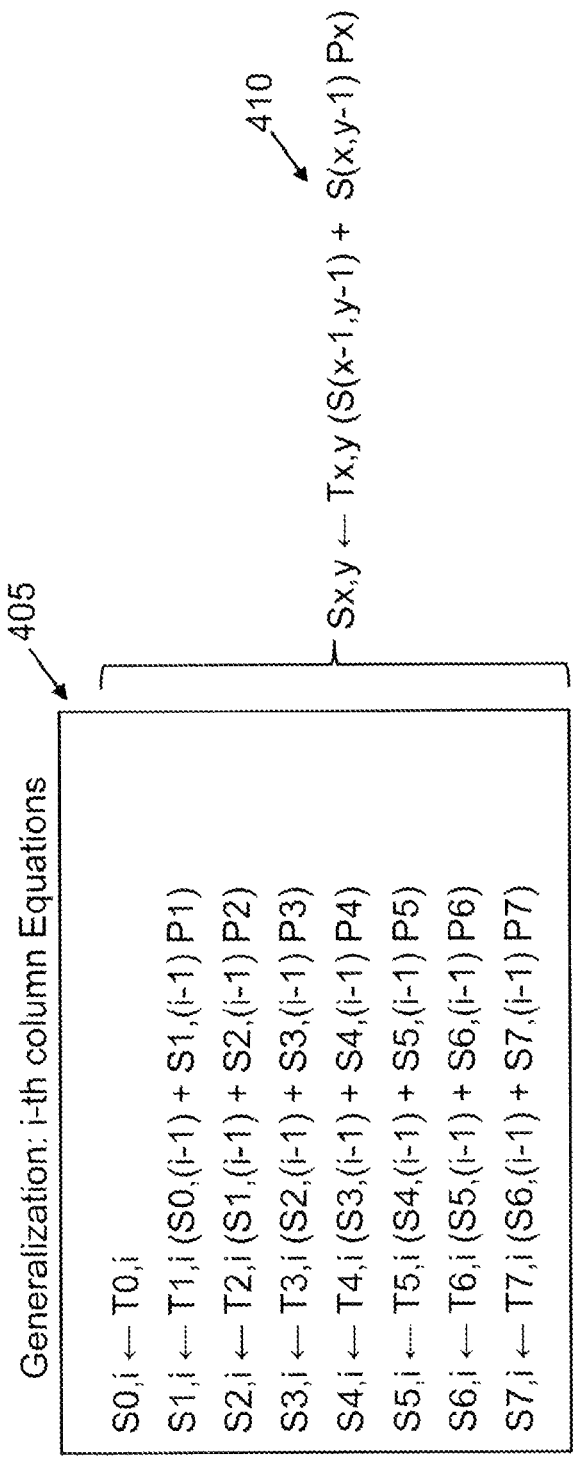
FIG. 4 depicts a generalization of equations which apply to an i-th (or ith) column, where the i-th column is any one of the columns in the comparison chart in accordance with an embodiment.

According to an embodiment, FIG. 4 illustrates a generalization of the equations (including equations for the zero and first columns) which apply to an i-th (or ith) column, where the i-th column is any one of the columns 0-15 in the comparison chart 205. The i-th column equations 405 show each state (e.g., states S1 through S7) for any column in the comparison chart 205. The i-th column equations 405 can be further generalized into equations 410 for any state 'x' and any column 'y', as shown by Sx,y←Tx,y (S(x−1,y−1)+S(x, y−1)Px) which is designated as equation 410 in FIG. 4. The equation 410 is executed by the processor 105 (via software application 114) or directly in hardware circuits.

In Sx,y←Tx,y(S(x−1,y−1)+S(x,y−1)Px), Sx,y is true when the y-th bit of the string input has caused state "x" to become true. The states are numbered in a progression from states 0 to 7, with state 0 needing to be achieved prior to state 1, with state 1 needing to be achieved prior to state 2, with state 2 needing to be achieved prior to state 3, and so forth.

In Sx,y←Tx,y(S(x−1,y−1)+S(x,y−1)Px), Tx,y signals the range compare for the x-th state is true for input element y. For instance, range compare x may be made up of >'a' and <'z', and let's say y=2 and the input string is "01c34" then element y is 'c' and 'c' is a character within this range, so Tx,y for y=2 would be true or a value of 1.

In Sx,y←Tx,y(S(x−1,y−1)+S(x,y−1)Px), Px is true when the state "x" is allowed to occur one or more times consecutively. The equation 410 shows that state Sx,y is valid when the range compare for state x is true for input element y and either state S(x−1,y−1) is valid or state S(x,y−1) is valid and there is a plus indicator for state x, symbolized by Px. The first state, S0,y simplifies to just a truth of the range compare for state 0 for input element i.

Note juxtaposition (side-by-side) indicates the logical AND operation, and "+" indicates the logical OR operation.

Completion is indicated by the logical OR of the last state for every input element. Completion=S7,0+S7,1+S7,2+ . . . S7,15.

State information is saved (by the software application 114) from the last input elements column to the output (e.g., operand T in register rOpT) to be used in subsequent iterations (e.g., the next substring to be evaluated). This information is represented by Sx,15 for x equal to 0 through 7. This tells (the processor 105) whether the last element in an input reached a particular state. The state information includes the number of states that have been achieved for this substring being evaluated against the pattern, and the state information is passed to the next run for the next substring to be evaluated. The state information allows the software application 114 to know the last state that was reached.

Figure 5:
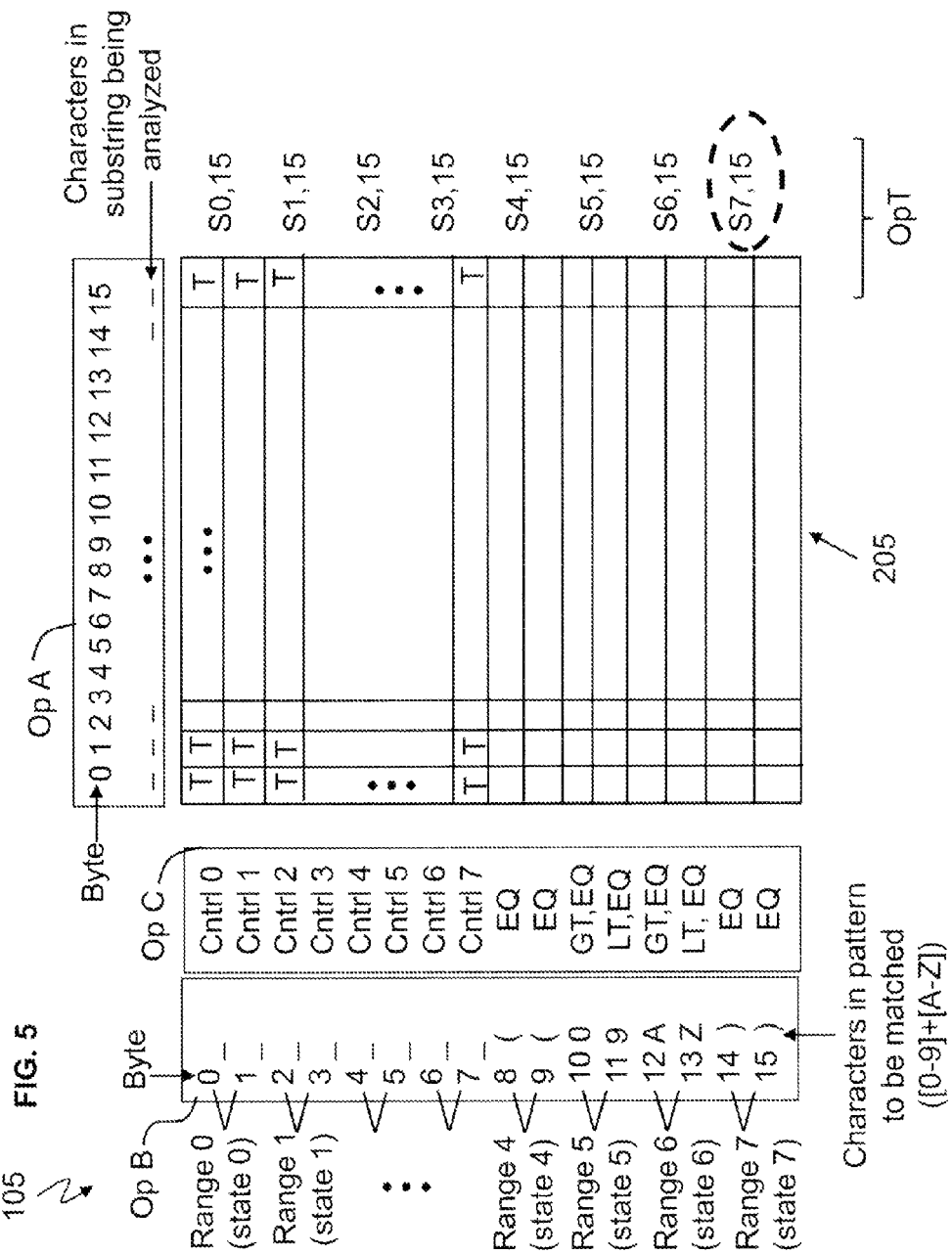
FIG. 5 depicts pattern matching for a character pattern that is smaller than 8 states in accordance with an embodiment.

Although examples defined the operand A and B to each contain 16 bytes corresponding to 16 characters, there may be fewer than 16 characters in the pattern to be matched in the operand B. To apply teachings of the present disclosure to smaller than 16 character patterns, FIG. 5 illustrates a character pattern that is smaller than 8 characters. In FIG. 5, the processor 105 may utilize the registers 115 for operands A, B, C, and T as discussed herein, which have now been adapted for a smaller pattern.

As mentioned earlier, assume that operand B is a description of pattern "([0-9]+[A-Z])". In this pattern, there are only 4 characters to be matched which are an open parenthesis '(', followed by one or more numeric digits, followed by an uppercase alphabetical character, followed by an end of parenthesis ')'. To search for this pattern, the processor 105 shifts the pattern to the bottom of the operand B (register rOpB), and forces true (T) compares on top of the pattern (e.g., EQ, GT, and LT=1) for bytes 0-7 corresponding to rows 0-7. Accordingly, the actual evaluation of the pattern in operand B against the substring in operand A begins at the '(' for byte 8 and ends with ')' for byte 15.

Figure 6:
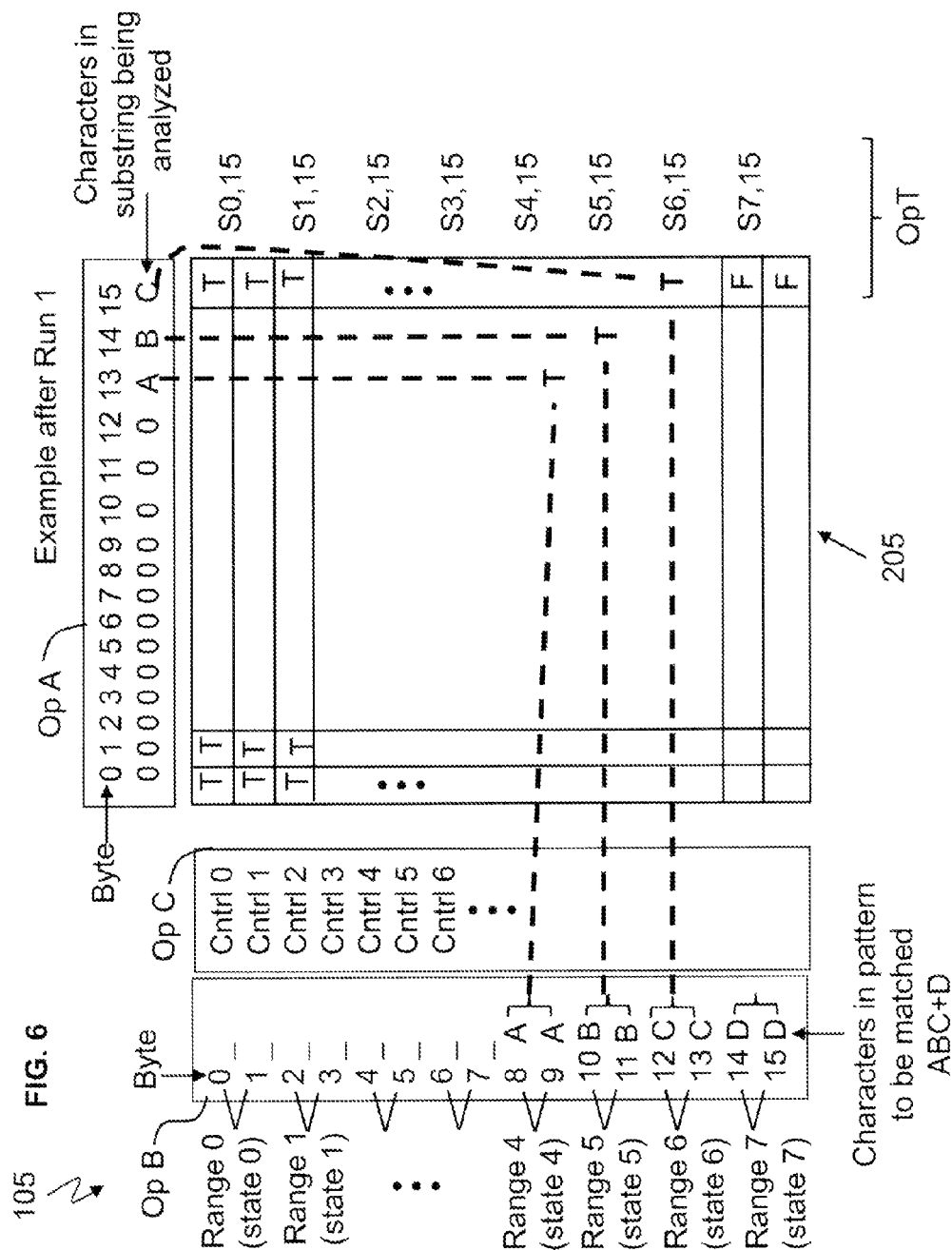
FIG. 6 depicts pattern matching for a character pattern that is smaller than 8 states for the pattern "ABC+D" in accordance with an embodiment.

FIG. 6 illustrates an example of another character pattern (e.g., in operand B) that is smaller than 16 characters. In FIG. 6, the pattern is "ABC+D" which equals and is written in operand B as "00000000AABBCCDD" to be evaluated against the substring loaded into operand A. It is noted that multiple runs and/or iterations can be executed by the processor 105 to match the pattern in operand B by loading the operand A with the next substring (e.g., substring 1 through substring N of the input string 150) from the buffer 170 to execute the next run. FIG. 6 shows the processor 105 evaluating "ABC+D"="00000000AABBCCDD" in operand B against the first substring (e.g., substring 1) loaded into operand A (register rOpA), and the 16 characters of the first substring are "0000000000000ABC".

The comparison chart 205 shows an abbreviated version after run 1 (i.e., the first iteration for the first substring loaded into operand A), and subsequent substrings are respectively loaded one at a time into operand A for their respective run (evaluation). After run 1, the processor 105 (automatically) determines that state 0 through state 3 are true because the operand C has been defined to be true (T), without requiring a match between operand B and operand A. Also, the processor 105 evaluates the ranges 4 through 7 (for states 4 through 7) to determine which ranges and states are true. As can be seen, range 4 for state 4 is true for 'A', range 5 for state 5 is true for "B", and range 6 for state 6 is true for 'C'. However, range 7 for state 7 is not true for 'D' in the pattern of operand B matching 'D' in operand A for the first substring, because the first substring of input string 150 does not contain the character 'D'. The next substring (e.g., substring 2) of the input sting 150 is loaded into operand A to be evaluated by the processor 150 as run 2. The output of run 1 including the states that are true (particularly state 6 (S6)) is stored in operand T (rOpT) which is utilized as the input to sequentially build upon state 6 determined as true in run 1. For run 2 that evaluates the next substring (e.g., substring 2) of the input substring 150 now loaded into operand A, the evaluation of run 2 can start from state 6 (S6) as true because state 6 was already fulfilled in run 1. For state 6 to be true state 0 through state 5 must already be true. States 0 through 6 being true was passed as state information to run 2 (which is the recognized as the next run) and is stored into operand T (rOpT). Run 2 evaluates the pattern in operand B against the current input substring (e.g., substring 2) just loaded into operand A. This evaluation process (e.g., run 1 through the last run) and passing each of the states fulfilled as true will continue until the entire input string 150 has been evaluated.

For run 1, FIGS. 7 and 8 detail the evaluation 700 (by processor 105) of the equations for the most left column (i.e., zero column) for the first input (i.e., first substring) in operand A which equals "0000000000000ABC".

The evaluations of column 1 though 14 are omitted. For run 1, FIGS. 9 and 10 detail the evaluation 900 (by processor 105) of the equations for the 15th column (i.e., last column) for the first input (i.e., first substring) in operand A which equals "0000000000000ABC". Once run 1 is completed for the first substring, the output (the states found to be true during run 1) is input into operand T to be used as the starting point for run 2. Run 2 evaluates the second substring, and the process continues until the patterned is matched or until the last substring has been evaluated.

Figure 11:
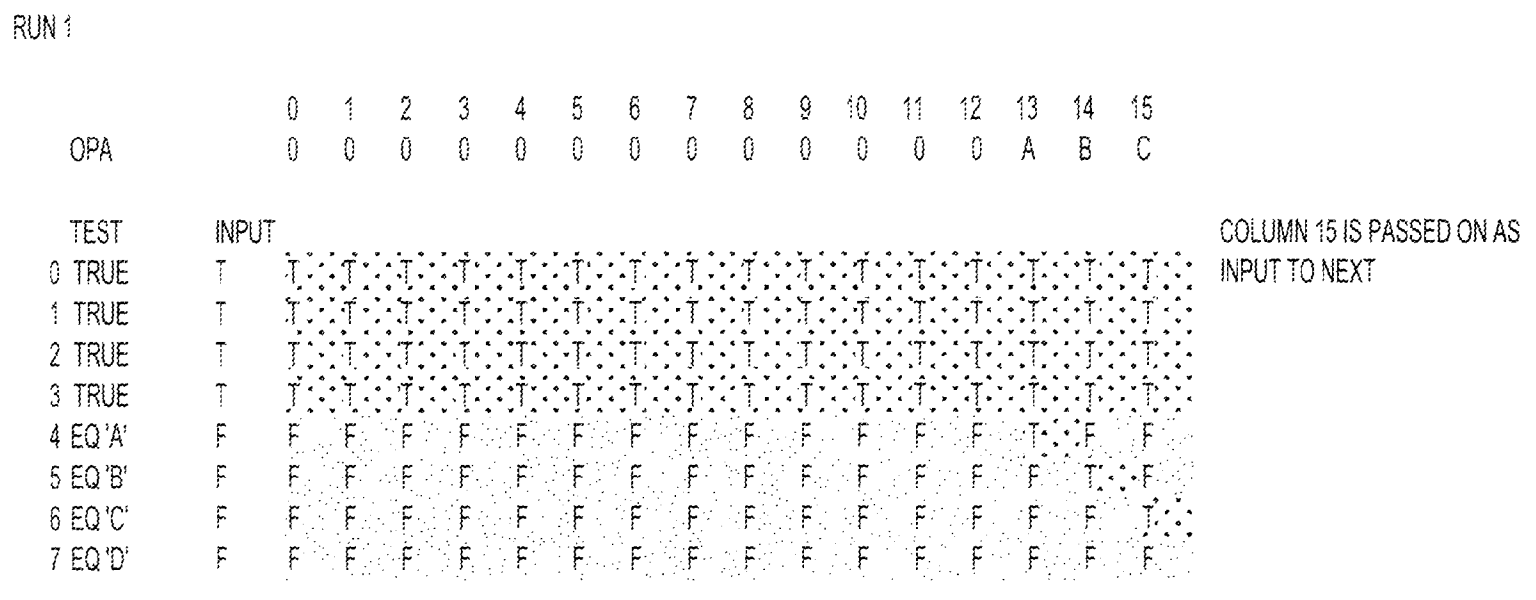

For run 1 executed by the processor 105, FIG. 11 shows the results of the evaluations of operand B against operand A for the first substring. Based on the evaluations by the processor 105, the number of states achieved for the pattern is passed to the next run (e.g., run 2).

Figure 12:
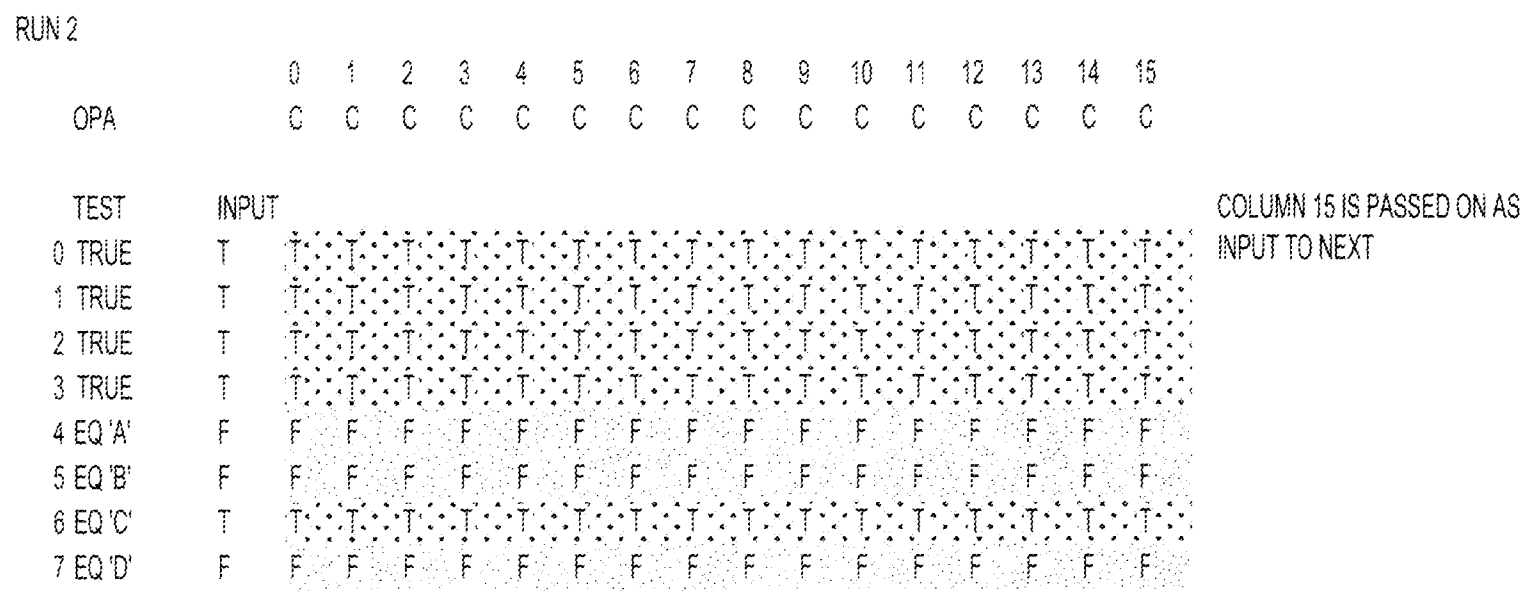

For run 2 executed by the processor 105, FIG. 12 shows the results of the evaluations of operand B against operand A for the second substring (now loaded into rOpA). Based on the evaluations (during run 2) by the processor 105, the number of states achieved for the pattern is passed to the next run (which is run 3).

For run 3 executed by the processor 105, FIG. 13 shows the results of the evaluations of operand B against operand A for the third substring (now loaded into rOpA). In column 8 the character 'D' in operand A has been matched character 'D' in operand B, which corresponds to state 7 being true. As such, the pattern "ABC+D" which equals and is written in operand B as "00000000AABBCCDD" has been matched to the input string 150 (during run 3).

Figure 14:
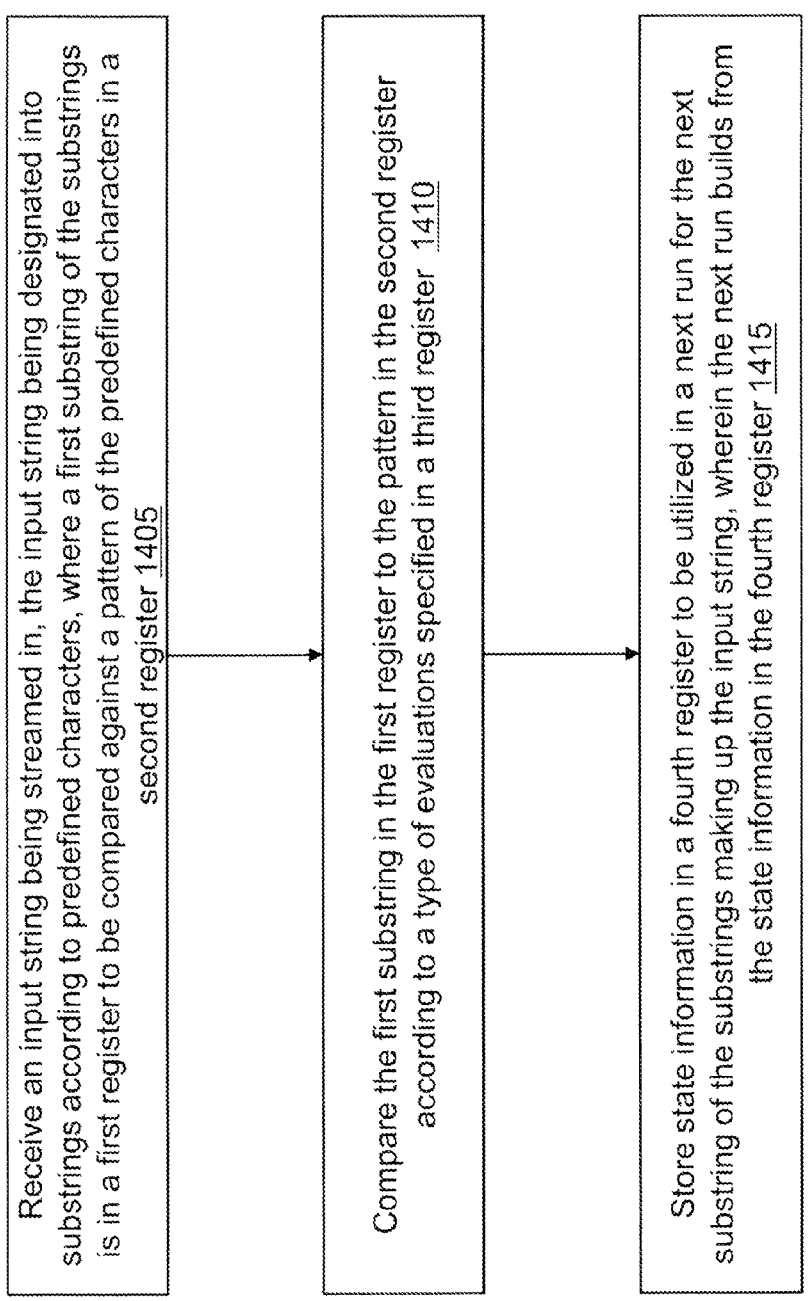
FIG. 14 depicts a process flow for pattern matching in accordance with an embodiment.

FIG. 14 is a flow diagram 1400 of a method for pattern matching on the computer system 100 according to an embodiment.

At block 1405, the computer system 100 is configured to receive an input string streamed in as input, and the input string is designated into substrings according to predefined bytes, where a first substring of the substrings is in a first register to be compared against a pattern of the predefined bytes in a second register.

The computer system 100 is configured to compare the first substring in the first register to the pattern in the second register according to a type of evaluations specified in a third register at block 1410.

The computer system 100 is configured to store state information in a fourth register to be utilized in a next run for the next substring of the substrings making up the input string, where the next run builds from the state information in the fourth register at block 1415.

FIG. 15 illustrates an example of a computer 1500 (e.g., as part of the computer system 100 and/or computer system 100 may incorporate features of the computer 1500) having capabilities, which may be included in exemplary embodiments. Various methods, procedures, modules, flow diagrams, tools, applications, circuits, elements, equations, and techniques discussed herein may also incorporate and/or utilize the capabilities of the computer 1500. Moreover, capabilities of the computer 1500 may be utilized to implement features of exemplary embodiments discussed herein. One or more of the capabilities of the computer 1500 may be utilized to implement, incorporate, to connect to, and/or to support any element discussed herein (as understood by one skilled in the art) in FIGS. 1-14 and 16.

Generally, in terms of hardware architecture, the computer 1500 may include one or more processors 1510, computer readable storage memory 1520, and one or more input and/or output (I/O) devices 1570 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 1510 is a hardware device for executing software that can be stored in the memory 1520. The processor 1510 can be virtually any custom made or commercially available processor, a central processing unit (CPU), a data signal processor (DSP), or an auxiliary processor among several processors associated with the computer 1500, and the processor 1510 may be a semiconductor based microprocessor (in the form of a microchip) or a microprocessor.

The computer readable memory 1520 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 1520 may incorporate electronic, magnetic, optical, and/or other types of storage media. Note that the memory 1520 can have a distributed architecture, where various components are situated remote from one another, but can be accessed by the processor 1510.

The software in the computer readable memory 1520 may include one or more separate programs, each of which comprises an ordered listing of executable instructions for implementing logical functions. The software in the memory 1520 includes a suitable operating system (O/S) 1550, compiler 1540, source code 1530, and one or more applications 1560 of the exemplary embodiments. As illustrated, the application 1560 comprises numerous functional components for implementing the features, processes, methods, functions, and operations of the exemplary embodiments. The application 1560 of the computer 1500 may represent numerous applications, agents, software components, modules, interfaces, controllers, etc., as discussed herein but the application 1560 is not meant to be a limitation.

The operating system 1550 may control the execution of other computer programs, and provides scheduling, input-output control, file and data management, memory management, and communication control and related services.

The application 1560 may be a source program, executable program (object code), script, or any other entity comprising a set of instructions to be performed. When a source program, then the program is usually translated via a compiler (such as the compiler 1540), assembler, interpreter, or the like, which may or may not be included within the memory 1520, so as to operate properly in connection with the O/S 1550. Furthermore, the application 1560 can be written as (a) an object oriented programming language, which has classes of data and methods, or (b) a procedure programming language, which has routines, subroutines, and/or functions.

The I/O devices 1570 may include input devices (or peripherals) such as, for example but not limited to, a mouse, keyboard, scanner, microphone, camera, etc. Furthermore, the I/O devices 1570 may also include output devices (or peripherals), for example but not limited to, a printer, display, etc. Finally, the I/O devices 1570 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 1570 also include components for communicating over various networks, such as the Internet or an intranet. The I/O devices 1570 may be connected to and/or communicate with the processor 1510 utilizing Bluetooth connections and cables (via, e.g., Universal Serial Bus (USB) ports, serial ports, parallel ports, FireWire, HDMI (High-Definition Multimedia Interface), etc.).

When the computer 1500 is in operation, the processor 1510 is configured to execute software stored within the memory 1520, to communicate data to and from the memory 1520, and to generally control operations of the computer 1500 pursuant to the software. The application 1560 and the O/S 1550 are read, in whole or in part, by the processor 1510, perhaps buffered within the processor 1510, and then executed.

When the application 1560 is implemented in software it should be noted that the application 1560 can be stored on virtually any computer readable storage medium for use by or in connection with any computer related system or method.

The application 1560 can be embodied in any computer-readable medium for use by or in connection with an instruction execution system, apparatus, server, or device, such as a computer-based system, processor-containing system, or other system that can fetch the instructions from the instruction execution system, apparatus, or device and execute the instructions.

In exemplary embodiments, where the application 1560 is implemented in hardware, the application 1560 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It is understood that the computer 1500 includes non-limiting examples of software and hardware components that may be included in various devices, servers, and systems discussed herein, and it is understood that additional software and hardware components may be included in the various devices and systems discussed in exemplary embodiments.

A computer program product for pattern matching is provided. The computer program product comprises a tangible storage medium readable by a processing circuit and storing instructions for execution by the processing circuit for performing a method. The method comprises receiving an input string streamed in as input, the input string being designated into substrings according to predefined bytes, wherein a first substring of the substrings is in a first register to be compared against a pattern of the predefined bytes in a second register; comparing, by the processing circuit, the first substring in the first register to the pattern in the second register according to a type of evaluations specified in a third register; based on the comparing, determining state information that comprises a number of states achieved for the pattern; and storing state information in a fourth register to be utilized in a next run for the next substring of the substrings making up the input string, wherein the next run builds from the state information in the fourth register.

The method also comprises evaluating a regular expression by separating the pattern into character ranges formed by pairing two character comparisons; and designating the range as a state in which the state is met when the corresponding evaluations of the two characters are true.

The method comprises designating a first range through a last range corresponding to a first state through a last state based on breaking the regular expression into paired comparisons.

The method comprises evaluating each of the first range through the last range for the first substring to determine whether the last state is evaluated as true; based on the last state being evaluated at true, determining that the pattern in the second register matches the first substring; and based on the last state not being evaluated as true or based on not reaching the last state, storing a current state that has been reached in the fourth register once the first substring is completed to be utilized as input for comparing the pattern against the next substring.

Further, the method comprises sequentially continuing pattern matching of the input string by evaluating the next substring from the current state stored in the fourth register.

The method comprises recognizing that the current state has been reached in evaluating the first string; and evaluating the next substring from the current state that has been reached until the pattern in the second register is matched.

The method in which the current state stored in the fourth register is a most recent state identified while matching a previous substring to the pattern in the second register.

The method comprises corresponding every character in the pattern to a byte in the second register; and configuring every two bytes in the pattern in the second register to define the range based on the type of evaluations specified in the third register, until the first range through the last range are defined.

As will be appreciated by one skilled in the art, one or more aspects of the present invention may be embodied as a system, method or computer program product. Accordingly, one or more aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, one or more aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Referring now to FIG. 16, in one example, a computer program product 1600 includes, for instance, one or more storage media 1602, wherein the media may be tangible and/or non-transitory, to store computer readable program code means or logic 1604 thereon to provide and facilitate one or more aspects of embodiments described herein.

Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit. Such program code may be created using a compiler or assembler for example, to assemble instructions, that, when executed perform aspects of the invention.

Technical effects and benefits include a new instruction which examines a substring (e.g., 16 bytes) at a time and determines how many states in the input string pattern have been achieved and/or whether the whole pattern has been met. The instruction outputs the states achieved into the next invocation (run) and eventually set a condition code when the end pattern has been achieved.

The terminology used herein is for the purpose of describing particular embodiments only and is not intended to be limiting of embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles and the practical application, and to enable others of ordinary skill in the art to understand the embodiments with various modifications as are suited to the particular use contemplated.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described above with reference to flowchart illustrations and/or schematic diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for pattern matching, the computer program pro duct comprising:
    a tangible non-transitory storage medium readable by a processing circuit and storing instructions for execution by the processing circuit for performing a method comprising:
    receiving an input string streamed in as input;
    designating the input string into substrings according to a predefined number of bytes, wherein a first substring of the substrings is in a first register to be compared against a pattern of the predefined number of bytes in a second register;
    wherein the predefined number of bytes in the pattern equals the predefined number of bytes separately in each of the substrings, such that the first substring comprises the predefined number of bytes;
    comparing, by the processing circuit, the first substring in the first register to the pattern in the second register according to a type of evaluations specified in a third register;
    based on the comparing, determining state information that comprises a number of states achieved for the pattern; and
    storing the state information in a fourth register to be utilized in a next run for a next substring of the substrings making up the input string, wherein the next run builds from the state information in the fourth register.

2. The computer program product of claim 1, further comprising evaluating a regular expression by separating the pattern into character ranges formed by pairing two characters comparisons;

designating the character range as a state in which the state is met when the corresponding evaluations of the two characters are true; and designating a first range through a last range corresponding to a first state through a last state based on breaking the regular expression into paired comparisons;

wherein the states comprise the first state through the last state and are sequentially related.

3. The computer program product of claim 2, further comprising evaluating each of the first range through the last range for the first substring to determine whether the last state is evaluated as true;

based on the last state being evaluated at true, determining that the pattern in the second register matches the first substring;

based on at least one of the last state not being evaluated as true and not reaching the last state, storing a current state that has been reached in the fourth register once the first substring is completed to be utilized as input for comparing the pattern against the next substring; and sequentially continuing pattern matching of the input string by evaluating the next substring from the current state stored in the fourth register;

wherein the current state stored in the fourth register is a most recent state identified while matching a previous substring to the pattern in the second register.

4. The computer program product of claim 3, further comprising recognizing that the current state has been reached in evaluating a first string; and evaluating the next substring from the current state that has been reached until the pattern in the second register is matched.

5. The computer program product of claim 2, further comprising corresponding every character in the pattern to a byte in the second register; and configuring every two bytes in the pattern in the second register to define the range based on the type of evaluations specified in the third register, until the first range through the last range are defined.

6. The computer program product of claim 2, wherein each character comprises at least one of a byte, a halfword, and a word in a format comprising at least one of ASCII, EBCDIC, UTF-8, and UTF-16;

wherein comparison allows for selection of at least one of greater than, less than, and equal to; and wherein a regular expression of less than eight states is compared by shifting the pattern to later states.

7. The computer program product of claim 2, wherein all the states are evaluated in parallel;

wherein the third register is an input control register, and wherein operation of the third register and the fourth register are interchangeable.

8. The computer program product of claim 1, wherein a "+" symbol is supported to define that an expression occurs at least one of one and more times;

wherein a "*" symbol is supported to define that at least one of zero and more expressions occur by separating the regular expression into multiple expressions; and wherein the output state achieved is passed in the fourth register to reduce a bottleneck effect of the pattern matching and to allow multiple patterns to be searched at a same time by utilizing more registers to hold different patterns.

9. A computer implemented method for pattern matching, the method comprising:

receiving an input string streamed in as input;

designating the input string into substrings according to a predefined number of bytes, wherein a first substring of the substrings is in a first register to be compared against a pattern of the predefined number of bytes in a second register;

comparing, by a processing circuit, the first substring in the first register to the pattern in the second register according to a type of evaluations specified in a third register;

wherein the predefined number of bytes in the pattern equals the predefined number of bytes separately in each of the substrings, such that the first substring comprises the predefined number of bytes;

based on the comparing, determining state information that comprises a number of states achieved for the pattern; and storing the state information in a fourth register to be utilized in a next run for a next substring of the substrings making up the input string, wherein the next run builds from the state information in the fourth register.

10. The method of claim 9, further comprising evaluating a regular expression by separating the pattern into character ranges formed by pairing two characters comparisons;

designating the character range as a state in which the state is met when the corresponding evaluations of the two characters are true; and designating a first range through a last range corresponding to a first state through a last state based on breaking the regular expression into paired comparisons;

wherein the states comprise the first state through the last state and are sequentially related.

11. The method of claim 10, further comprising evaluating each of the first range through the last range for the first substring to determine whether the last state is evaluated as true;

based on the last state being evaluated at true, determining that the pattern in the second register matches the first substring;

based on at least one of the last state not being evaluated as true and not reaching the last state, storing a current state that has been reached in the fourth register once the first substring is completed to be utilized as input for comparing the pattern against the next substring; and sequentially continuing pattern matching of the input string by evaluating the next substring from the current state stored in the fourth register;

wherein the current state stored in the fourth register is a most recent state identified while matching a previous substring to the pattern in the second register.

12. The method of claim 11, further comprising recognizing that the current state has been reached in evaluating a first string; and evaluating the next substring from the current state that has been reached until the pattern in the second register is matched.

13. The method of claim 10, further comprising corresponding every character in the pattern to a byte in the second register; and configuring every two bytes in the pattern in the second register to define the range based on the type of evaluations specified in the third register, until the first range through the last range are defined.

14. The method of claim 10, wherein each character comprises at least one of a byte, a halfword, and a word in a format comprising at least one of ASCII, EBCDIC, UTF-8, and UTF-16;
   wherein comparison allows for selection of at least one of greater than, less than, and equal to; and
   wherein a regular expression of less than eight states is compared by shifting the pattern to later states.

15. The method of claim 10, wherein all the states are evaluated in parallel;
   wherein the third register is an input control register, and
   wherein operation of the third register and the fourth register are interchangeable.

16. A computer system for pattern matching, the system comprising:
   a processing circuit, the system configured to perform a method comprising:
   receiving an input string streamed in as input;
   designating the input string into substrings according to a predefined number of bytes, wherein a first substring of the substrings is in a first register to be compared against a pattern of the predefined number of bytes in a second register;
   wherein the predefined number of bytes in the pattern equals the predefined number of bytes separately in each of the substrings, such that the first substring comprises the predefined number of bytes;
   comparing, by the processing circuit, the first substring in the first register to the pattern in the second register according to a type of evaluations specified in a third register;
   based on the comparing, determining state information that comprises a number of states achieved for the pattern;
   storing the state information in a fourth register to be utilized in a next run for a next substring of the substrings making up the input string, wherein the next run builds from the state information in the fourth register.

17. The computer system of claim 16, wherein the method further comprises evaluating a regular expression by separating the pattern into character ranges formed by pairing two characters comparisons;
   designating the character range as a state in which the state is met when the corresponding evaluations of the two characters are true; and
   designating a first range through a last range corresponding to a first state through a last state based on breaking the regular expression into paired comparisons;
   wherein the states comprise the first state through the last state and are sequentially related.

18. The computer system of claim 17, wherein the method further comprises evaluating each of the first range through the last range for the first substring to determine whether the last state is evaluated as true;
   based on the last state being evaluated at true, determining that the pattern in the second register matches the first substring;
   based on at least one of the last state not being evaluated as true and not reaching the last state, storing a current state that has been reached in the fourth register once the first substring is completed to be utilized as input for comparing the pattern against the next substring; and
   sequentially continuing pattern matching of the input string by evaluating the next substring from the current state stored in the fourth register;
   wherein the current state stored in the fourth register is a most recent state identified while matching a previous substring to the pattern in the second register.

19. The computer system of claim 18, wherein the method further comprises recognizing that the current state has been reached in evaluating a first string;
   evaluating the next substring from the current state that has been reached until the pattern in the second register is matched.

20. The computer system of claim 17, wherein the method further comprises corresponding every character in the pattern to a byte in the second register; and
   configuring every two bytes in the pattern in the second register to define the range based on the type of evaluations specified in the third register, until the first range through the last range are defined.

* * * * *